United States Patent [19]

Young

[11] Patent Number: 5,653,310
[45] Date of Patent: Aug. 5, 1997

[54] AIRLINE LUBRICATOR

[75] Inventor: Alan K. Young, Wake Forest, N.C.

[73] Assignee: Parker-Hannifin Corporation, Cleveland, Ohio

[21] Appl. No.: 508,315

[22] Filed: Jul. 27, 1995

[51] Int. Cl.$^6$ ................................................. F16N 17/06
[52] U.S. Cl. .......................... 184/59; 184/55.2; 261/78.1
[58] Field of Search .................... 184/55.1, 55.2, 184/58, 59; 261/78

[56] References Cited

U.S. PATENT DOCUMENTS

| | | | |
|---|---|---|---|
| 3,680,661 | 8/1972 | Delegowski . | |
| 3,703,940 | 11/1972 | Morita | 184/55.2 |
| 3,707,204 | 12/1972 | Dussardier | 184/55.2 |
| 3,926,280 | 12/1975 | Hoffman . | |
| 4,043,425 | 8/1977 | Schützer | 184/55.2 |
| 4,094,383 | 6/1978 | Thrasher, Jr. | 184/55.2 |
| 4,807,721 | 2/1989 | Fujiwara | 184/55.2 |

FOREIGN PATENT DOCUMENTS

| | | | |
|---|---|---|---|
| 0237606 | 9/1987 | European Pat. Off. | 184/55.2 |
| 0373231 | 12/1963 | Switzerland | 184/55.2 |
| 0848872 | 6/1981 | U.S.S.R. | 184/55.2 |

OTHER PUBLICATIONS

The Aro Corporation, "Aro Module/Air 2000 F-R-L" Nov. 1991, Front & back covers, pp. 2–5, 12, 13 and 16–19.

*Primary Examiner*—Thomas E. Denion
*Attorney, Agent, or Firm*—Renner, Otto, Boisselle & Sklar

[57] ABSTRACT

An airline lubricator characterized by the provision of a backstop which limits and controls the contour of the lubricator's flow restricting elastomeric flapper, whereby higher flow capacities may be achieved without sacrificing flapper service life, and by a sight tube seal plate that supplies lubricant to and from the sight tube via respective passages at least one of which has opposite ends thereof configured for communicating with transversely offset passages in the body of the lubricator head.

18 Claims, 6 Drawing Sheets

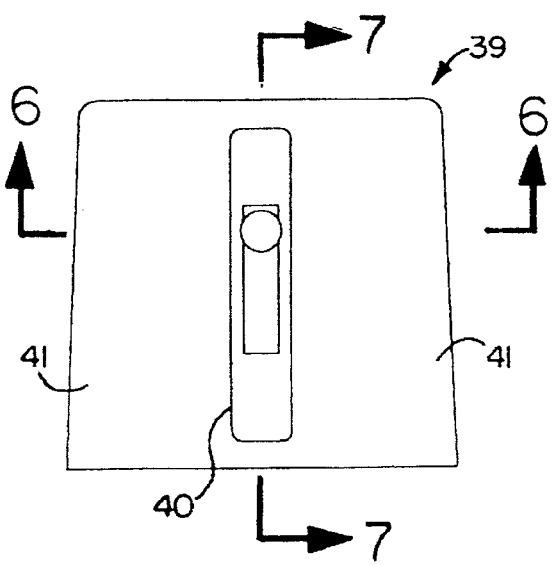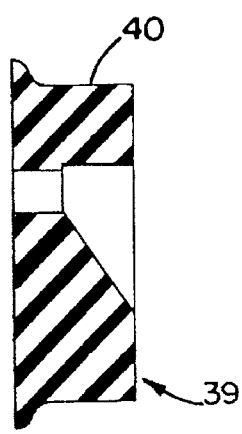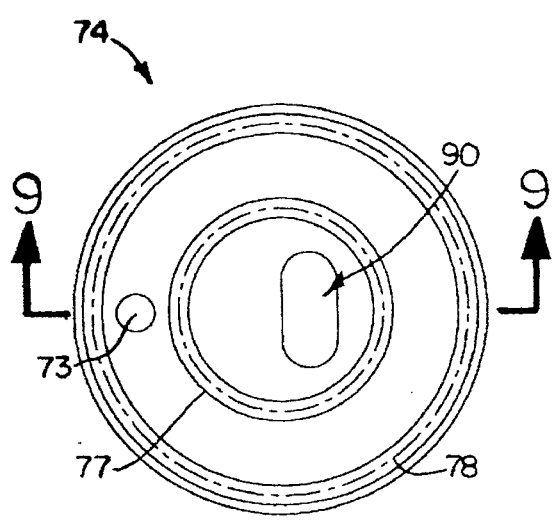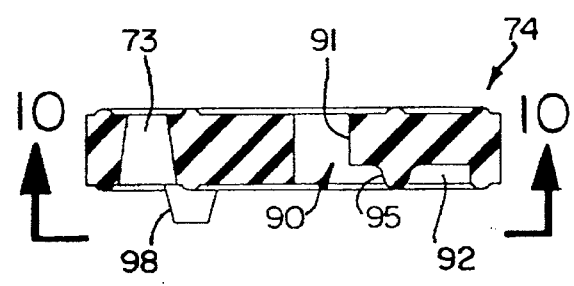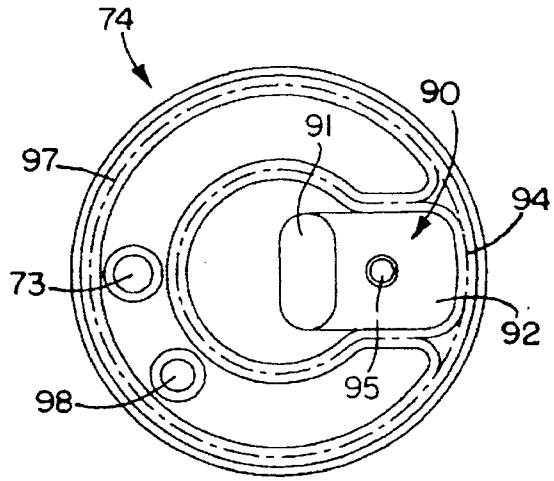

AIRLINE LUBRICATOR

The herein described invention relates generally to airline lubricators and, more particularly, to certain improvements in such lubricators which enable improved performance and more economical production of the lubricators.

BACKGROUND OF THE INVENTION

Known airline lubricators typically have a primary air flow passage through which air passes from an inlet port to an outlet port. The primary air flow or a portion of the incoming air flow is directed past an eductor orifice from which lubricant is dispensed as a spray into the air flow for mixing therewith by reason of the lower pressure of the moving air relative to the pressure in a lubricant bowl from which the lubricant is drawn. For proper operation, primary air flow heretofore has been restricted by an elastomeric flapper which extends across and normally closes the main air flow passage but is deflectable by pressure of air in the primary air flow passage upstream of the flapper.

In some lubricators, the primary air flow follows a relatively tortuous path involving multiple turns. Higher flow capacities may be achieved if primary air flow passes straight through the lubricator. However, lubricators using a straight flow path have encountered poor service life of the elastomeric flapper which then is exposed to high impact forces in use. In lubricators having a more tortuous air flow path, air momentum is absorbed as it traverses a turn, and this reduces the impact force on the elastomeric flapper located downstream of one or more turns, thereby improving the service life of the elastomeric flapper. It would be advantageous to be able to increase the flow capacity of a lubricator without a corresponding reduction in the service life of the elastomeric flapper, or vice versa.

Another desirable objective would be to reduce the cost and complexity of producing and servicing the lubricator. For low cost production, typically a major portion of the head of the lubricator is formed by a die casted body which has various machining operations performed thereon. In many if not most of the presently commercially available lubricators, a common design feature is an angled passageway drilled in the body to form a connecting passageway either supplying lubricant to a sight tube (often in the form of a dome) or supplying lubricant from the sight tube to an internal device which dispenses the lubricant into the air stream passing through the lubricator. It would be advantageous to provide a lubricator that does not require drilling of the angled passageway in the body the to reduce the amount of required machining, while at the same time simplifying assembly of the lubricator.

Some lubricator designs have previously avoided the need to drill the angled passageway. One such design limited the extent to which the sight tube could be transversely offset from the internal device. Another such design involved the use of a relatively difficult to install tube seal and did not employ a secondary air flow path for directing and accelerating air flow past the eductor orifice. Instead, a plastic insert had formed therein a transversely extending passageway leading directly from a location centered beneath the sight tube to an eductor orifice opening directly to the main flow passage of the lubricator.

SUMMARY OF THE INVENTION

The present invention provides various improvements in airline lubricators that remedy the aforesaid drawbacks of existing lubricator designs. One aspect of the invention is characterized by the provision of a backstop which limits and controls the contour of the lubricator's flow restricting elastomeric flapper, whereby higher flow capacities may be achieved without sacrificing flapper service life. Another aspect of the invention is characterized by a sight tube seal plate that supplies lubricant to and from the sight tube via respective passages at least one of which has opposite ends thereof configured for communicating with transversely offset passages in the body of the lubricator.

More particularly and according to one aspect of the invention, an airline lubricator comprises a main flow passage including therein a flow restrictor having an anchored portion from which a resilient flapper portion extends across and normally closes the main passage but is resiliently deflectable by pressure of air in the main passage upstream of the flapper portion. In accordance with the invention, there is provided a backstop downstream of the resiliently deflectable flapper portion that is configured to engage the flapper portion along a curved path and to limit maximum deflection of the flapper portion.

In a preferred embodiment, the backstop is configured to be progressively engaged by the flapper portion moving from the anchored portion of the restrictor to the free end of the flapper portion. More particularly, the backstop is progressively engaged by the flapper portion at a gradually curved surface, and the flapper portion extends tangentially with respect to the gradually curved at a point adjacent its anchored portion. The flow restrictor preferably is made of an elastomeric material and may have a central portion from which a pair of flapper portions extend in opposite directions for sealing against opposite sides of the main flow passage. The central portion, which is preferably centrally disposed in the main flow passage, may include an air inlet for a secondary flow passage including a venturi section for drawing lubricant into a secondary air stream flowing through the secondary flow passage.

According to another aspect of the invention, an airline lubricator comprises a bowl for containing a lubricant and a body to which the bowl is attached. The body has an inlet port for air, an outlet port for a mixture of air and lubricant, a primary passage connecting the inlet and outlet ports. A venturi section housed in the body includes a secondary passage connecting the inlet and outlet ports, and a lubricant supply passage intersecting the secondary passage for mixing of lubricant into a secondary air stream passing through the secondary passage. The lubricator also comprises inner and outer sight tubes having open bottoms, and an elastomeric sealing plate for sealing the open bottoms to the body. The sealing plate includes an inlet passage through which lubricant is supplied from the bowl to a flow space between the inner and outer sight tubes, and an outlet passage for supplying lubricant from within the inner sight tube to a laterally offset passage in the body vertically disposed above a lubricant supply passage in the body.

In a preferred embodiment, the sealing plate is disc-shaped for axial assembly into a bore in the body, after which the inner and outer sight tubes are assembled axially thereover with the sealing plate being sandwiched between the inner and outer sight tubes and a bottom of the bore. The sealing plate has a pair of concentric annular sealing beads on the top surface thereof for engaging the bottom edges of the inner and outer sight tubes, respectively. The outlet passage has a vertical section opening to the top of the sealing plate radially inwardly of the inner sight tube and a horizontal section extending radially from the vertical section, the horizontal section preferably having a bottom wall thereof formed by a surface of the body.

The foregoing and other features of the invention are hereinafter more fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 5 is an elevational view of the flapper member of the insert assembly.

FIG. 6 is a cross-sectional view of the flapper taken along the line 6—6 of FIG. 5.

FIG. 7 is a cross-sectional view of the flapper taken along the line 7—7 of FIG. 5.

FIG. 8 is a plan view of a sight tube sealing plate according to the invention.

FIG. 9 is a cross-sectional view of the sealing plate taken along the line 9—9 of FIG. 8.

FIG. 10 is a bottom view of the sealing plate looking from the line 10—10 of FIG. 9.

DETAILED DESCRIPTION

Figure 1:
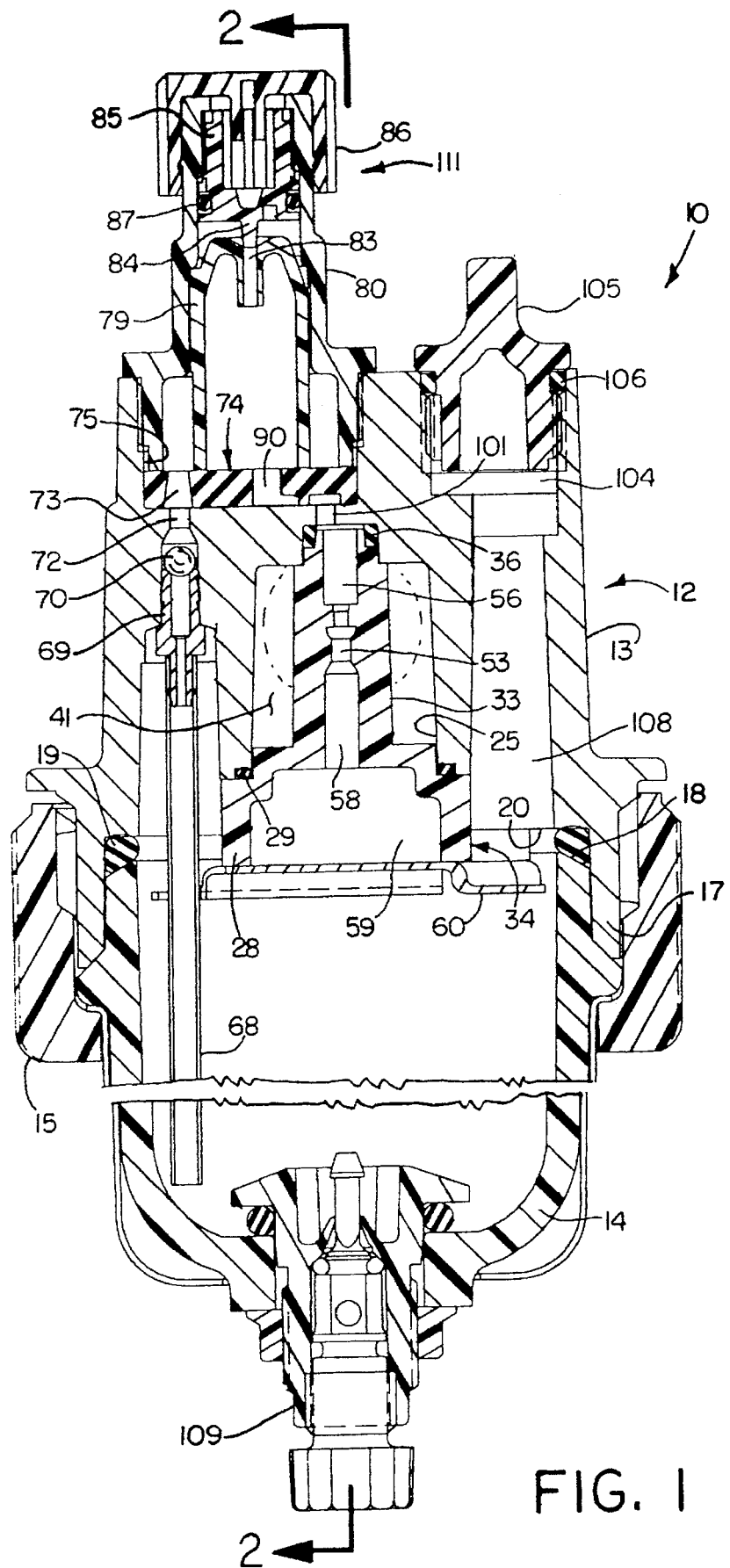
FIG. 1 is a fragmentary cross-sectional view of an airline lubricator according to the invention.
Figure 2:
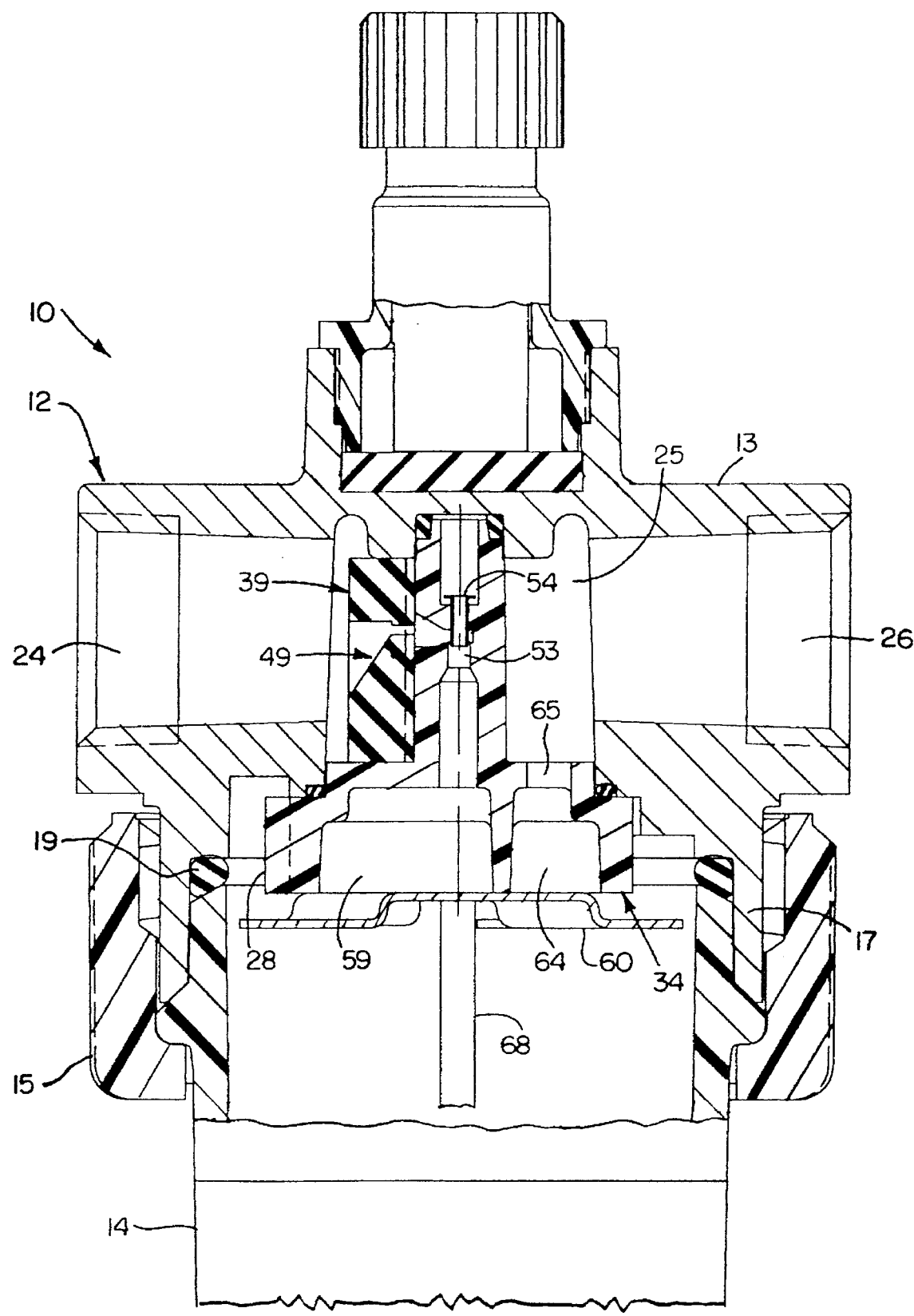
FIG. 2 is a fragmentary cross-sectional view of the lubricator taken substantially along the line 2—2 of FIG. 1.

Referring now in detail to the drawings and initially to FIGS. 1 and 2, a preferred embodiment of airline lubricator according to the invention, indicated generally at 10, comprises a head 12 including a body 13 to which a bowl 14 or other lubricant reservoir is removably attached by a collar 15. The upper end portion of the bowl is telescoped into a cylindrical skirt portion 17 of the body 13 and has a top edge surface 18. An elastomeric ring 19 is engaged between the top edge surface 18 and a shoulder surface 20 extending radially inwardly from the skirt portion 17 and forming therewith a corner extending circumferentially around the cylindrical socket formed by the skirt portion 17. Preferably, the upper edge surface 18 is conical such that it acts on the elastomeric ring 19 to cam the same radially outwardly and into wedged engagement with the shoulder and adjacent inner diameter surface of the skirt portion 17 to provide a tight fluid seal, even when the collar 15 is only hand tightened without the aid of a tool. The collar has ribs or other means on the outer diameter surface thereof to facilitate non-slip gripping of the collar when it is being tightened.

Figure 3:
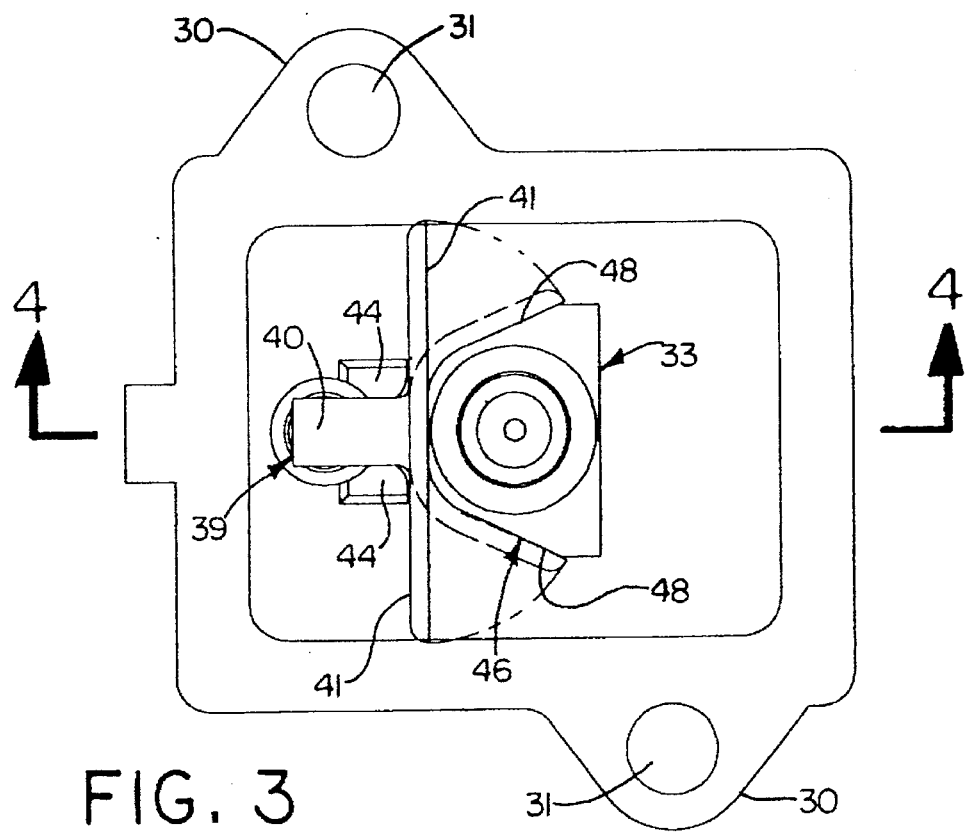
FIG. 3 is an enlarged plan view of an insert assembly used in the lubricator of FIG. 1, showing in broken lines a full deflected position of the flapper.

The body 13 has a main air passage comprising an inlet port 24, a center chamber 25 and an outlet port 26. The center chamber in the body 13 has an open lower end which is closed by a base 28. The base 28 is secured by screws (not shown) or other suitable fastening means to the body 13 and is sealed against the underside of the body by an annular packing ring 29. As shown in FIG. 3, the base has laterally protruding ears 30 each including a hole 31 for a screw used to secure the base to the body 13. Projecting upwardly from the base into the center chamber 25 is an injector member 33 that preferably is formed integrally with the base 28. While the body 13 preferably is formed as a metal casting, the base 28 and injector member 33 preferably are formed as a molded plastic insert 34 that may be removably attached to the body 13. The top of the injector member preferably extends into a recess in the top wall of the center chamber 25 and is sealed to the top wall by an annular packing ring 36.

As shown in FIGS. 1–4, the injector member 33 has assembled with respect thereto a flow restrictor in the form of an elastomeric flapper member 39 which is shown by itself in FIGS. 5–7. The flapper member 39 has a central base portion 40 from which a pair of relatively thin flapper arms 41 extend in opposite directions. The flapper arms span the main passage through central chamber 25 and normally sealingly engage the respectively adjacent walls of the main passage. In this manner the flappers normally close the area between the injector member and sides of the central chamber, which area is herein denoted a primary flow passage wherein flow is restricted by the flapper arms. As the pressure upstream of the flapper arms increases relative to the pressure downstream thereof, the flapper arms will be caused to flex rearwardly (downstream) by an amount related to the air flow rate.

Figure 4:
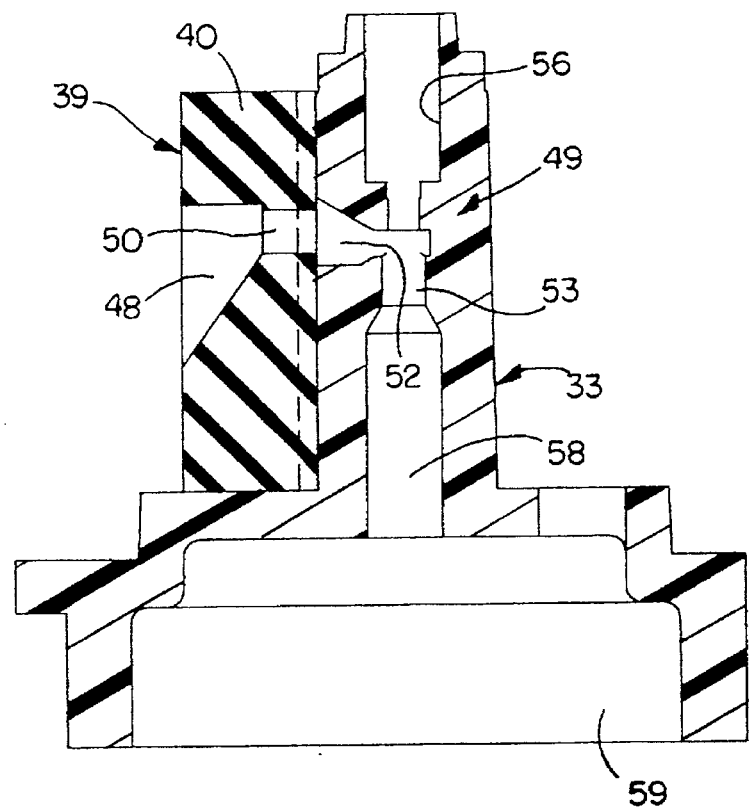
FIG. 4 is an enlarged cross-sectional view of the insert assembly taken along the line 4—4 of FIG. 3.

As best shown in FIGS. 3 and 4, the base portion 40 is laterally retained between a pair of laterally spaced apart posts 44 and longitudinally retained between the posts and the injector member 33 which also functions as a backstop located downstream of the posts and flapper member. The mounting posts and injector member extend upwardly from the base and define therebetween slots into which the base portion and anchored end portions of the flapper arms 41 can be slid from the top to form an insert assembly with the injector member and base piece. In relation to its function as a backstop, the injector member has a contoured upstream surface 46 which limits and controls the contour of the service deflection of the flapper arms. As shown, the contoured surface, which extends substantially the full height of the flapper arms, is generally U-shape with rounded corners at the base of the U and outwardly flared side surface portions 48 corresponding to the legs of the U. The side surfaces correspond to maximum service deflection of the flapper arms indicated by broken lines. Accordingly, maximum travel of the flapper arms is limited to maximum service deflection to reduce fatigue stress while still achieving maximum rated flow of the lubricator.

The backstop surface 46 also controls the radius of bending of the flapper arms to reduce bending stress and further to control the location of the bend, the bend being relocated away from the corner formed between each flapper arm and the base portion to reduce stress concentration effects at the corner and thus promote longer service life. To this end, the side surfaces of the backstop extend tangentially from the unflexed position of the flapper arms at a point commencing laterally outwardly of the corner formed between the respective flapper arm 41 and base portion 40, this causing the bend to be laterally displaced from the corner where it otherwise would bend with consequent stress concentration effects.

As further shown in FIGS. 1–7 (and particularly in FIG. 4), the base portion 40 of the flapper member 39 includes an inlet passage 48 of a venturi section 49. The inlet passage 48 has a wide mouth facing upstream in the main passage for capturing a portion of the air flow for passage along a secondary flow path separate from the primary flow path. The inlet passage narrows to a smaller passage 50 at the rear of the base portion which directs the secondary flow into a second but smaller narrowing passage 52 in the injector member 33. The second passage has its narrow end intersecting a vertical throat 53 at the upper end of the latter into which a nozzle tube 54 extends as shown in FIG. 2 (the nozzle tube has been omitted from FIGS. 1, 3 and 4). The nozzle tube 54 is fitted in a hole in the injector member coaxial with the throat by insertion through a larger diameter lubricant supply hole 56 opening to the top end of the injector member. The nozzle tube may have a radially enlarged head for facilitating proper positioning of the tube relative to the throat. The diameter of the nozzle tube adjacent its bottom end forming an injector orifice is smaller than the diameter of the upper portion of the throat such that the secondary air stream flows as an annulus around the lower end of the nozzle tube and then past the injector orifice where the accelerated air flow expands in the throat and then further expands as it passes into a still larger diameter vertical passage separator 58. This latter passage opens to the top of a dome shaped recess 59 in the bottom of the base 28 which is open to the upper portion of the bowl and has located therebeneath a deflector 60 (FIGS. 1 and 2) mounted at the bottom end of the base.

The base 28 also has in the bottom thereof a second dome shaped recess 64 open to the interior of the bowl but shielded by the deflector 60. The second recess 64 is connected by a passage 65 in the base to the chamber 25 downstream of the restrictor 39 and provides for pressurization of the bowl 14 as well as passage of fine lubricant particles from the bowl to the main passage for flow out through the outlet port 26. This pressurization of the bowl, coupled with reduced pressure in the throat 53, produces flow of lubricant through a lubricant delivery flow path. The lubricant is drawn upward in a pick-up tube 68 through a fitting 69 that provides for telescopic attachment of the pick-up tube and a valve seat for a check valve ball 70. Lubricant flow past the valve ball moves into a short vertical passage 72 in the body 13 that is aligned with an inlet passage 73 in an elastomeric sight tube sealing plate 74 retained in an upwardly opening bore 75 in the top of the body.

As shown in FIGS. 8 and 9, the sealing plate 74 has on its top side a pair of concentric annular beads 77 and 78. The beads 77 and 78 respectively engage and form a fluid tight seal with the bottom annular edges of inner and outer concentric sight tubes 79 and 80 as shown in FIG. 1. This reference to sight tubes is also intended to encompass sight domes and other like structures provided to confirm lubricant flow and/or facilitate adjustment of the lubricant flow rate. Accordingly, the sight tubes preferably are made of transparent plastic material. The outer sight tube has a radially enlarged lower portion that is externally threaded for screwing into a threaded upper portion of the bore 75.

The inlet passage 73 in the sealing plate 74 opens to the space between the tubes 79 and 80 for passage upwardly to a hole 83 in the top of the inner dome 79. A needle valve element 84 extends into the hole and forms therewith an adjustable metering orifice for controlling the lubricant flow rate. The needle valve element is carried by an adjustment screw 85 which is movable axially by turning an adjustment knob 86 rotatably mounted on the upper end of the outer sight tube. The adjustment screw is sealed to the inner diameter of the outer sight tube by an annular sealing member 87.

From the metering orifice, the lubricant drips into the interior of the inner sight tube 79 and drops onto the sealing plate 74 interiorly of the inner annular bead 77 on the top side of the sealing plate. An outlet passage 90 in the sealing plate has a vertical portion 91 that opens at one end to the top side of the sealing plate interiorly of the inner annular bead. The other end of the vertical section opens to a radially extending recess in the bottom of the sealing plate which forms a transversely extending section 92 of the outlet passage with the bottom surface of the bore 75. As shown in FIGS. 9 and 10, this recess is bounded by a keyhole shape bead 94. The recess has at the central region thereof a post-like structure 95 for supporting the roof of the recess beneath the inner sealing bead 77 to ensure a tight seal between the inner sight tube and the sealing ring in the region of the recess. As also shown in FIGS. 9 and 10, the bottom opening of the inlet passage is bounded by a crescent shape perimeter bead 97 having radially inner and outer portions thereof located opposite the inner and outer beads on the top side of the sealing plate. The sealing plate also has a locating key 98 protruding from its bottom surface for fitting in a corresponding key hole in the bottom of the bore 75. This ensures proper registry of the inlet and outlet passages 73 and 90 in the sealing plate relative to the sight tubes and connecting passages in the body.

The radially extending passage section 92 formed by the sealing ring 74 enables flow of lubricant from the off-center inner sight tube 79 to a location above the upper end of the ejector member 33 for passage into the supply hole 56 without having to drill an angled passageway in the body. Instead, lubricant flows from the radially inner end of the transverse passage section 92 to a vertical hole 101 in the body which may be easily formed during casting of the body, or molding of the body should it be desirable to form the body from plastic. The hole 101 radially overlaps the upper end of the supply hole 56.

Referring back to FIG. 1, the body 13 has a threaded fill hole 104 through which the bowl 14 may be filled with lubricant. The fill hole is normally closed by a screw-in plug 105 sealed to the body by an annular seal 106. The bottom end of the fill hole overlaps a deep chamber 108 formed in the bottom of the body which is open at its lower end to the top end of the bowl. At the bottom end of the bowl there is provided a drain 109 for emptying the bowl when desired.

In operation of the lubricator 10, air flowing through the unit goes through two paths. At low air flow rates, the majority of the air flows through the venturi section 49 and throat 53 while the rest of the air slightly deflects and flows by the flapper arms 41. The velocity of the air flowing through the venturi section creates a pressure drop at the throat. This lower pressure allows lubricant to be forced from the reservoir in the bowl 14 through the pick-up tube 68 past the check valve 70, to the metering assembly (denoted generally by reference numbered 111 in FIG. 1) where the rate of lubricant delivery is controlled by the metering screw. Rotation of the metering screw 85 in one direction increases the flow rate and in the opposite direction decreases the flow rate. Drops of lubricant fall from the metering orifice through the inner sight tube 79 that then flow through the outlet passage 90 in the sealing plate 74 to and into the nozzle tube 54 (FIG. 2). The lubricant drawn from the injector orifice at the end of the nozzle tube is broken into fine particles as it expands into the low pressure throat 53. From there, the atomized lubricant flows through the vertical drop separator passage 58 wherein the larger particles of lubricant separate from the air stream flowing into the upper region of the bowl and fall back into the reservoir where they can be recirculated. The remaining mist of fine particles (which may be 5 microns or smaller—about 3% which passes through the sight tube) is then carried through the passage 65 for joining and mixing with air that bypassed the flow restrictor 39. As air flow rate increases, the flapper arms 41 deflect further to allow more and then most of the inlet air to bypass the venturi section. However, a portion of the inlet air always passes through the venturi section, assuring that lubricant delivery increases linearly with increased air flow rate. This proportioning method is advantageous at low inlet flows because the venturi design remains efficient.

The check ball 70 prevents reverse lubricant flow down the pick-up tube 68 when air flow stops. Thus, lubricant delivery can resume immediately when air flow restarts.

Figure 11:
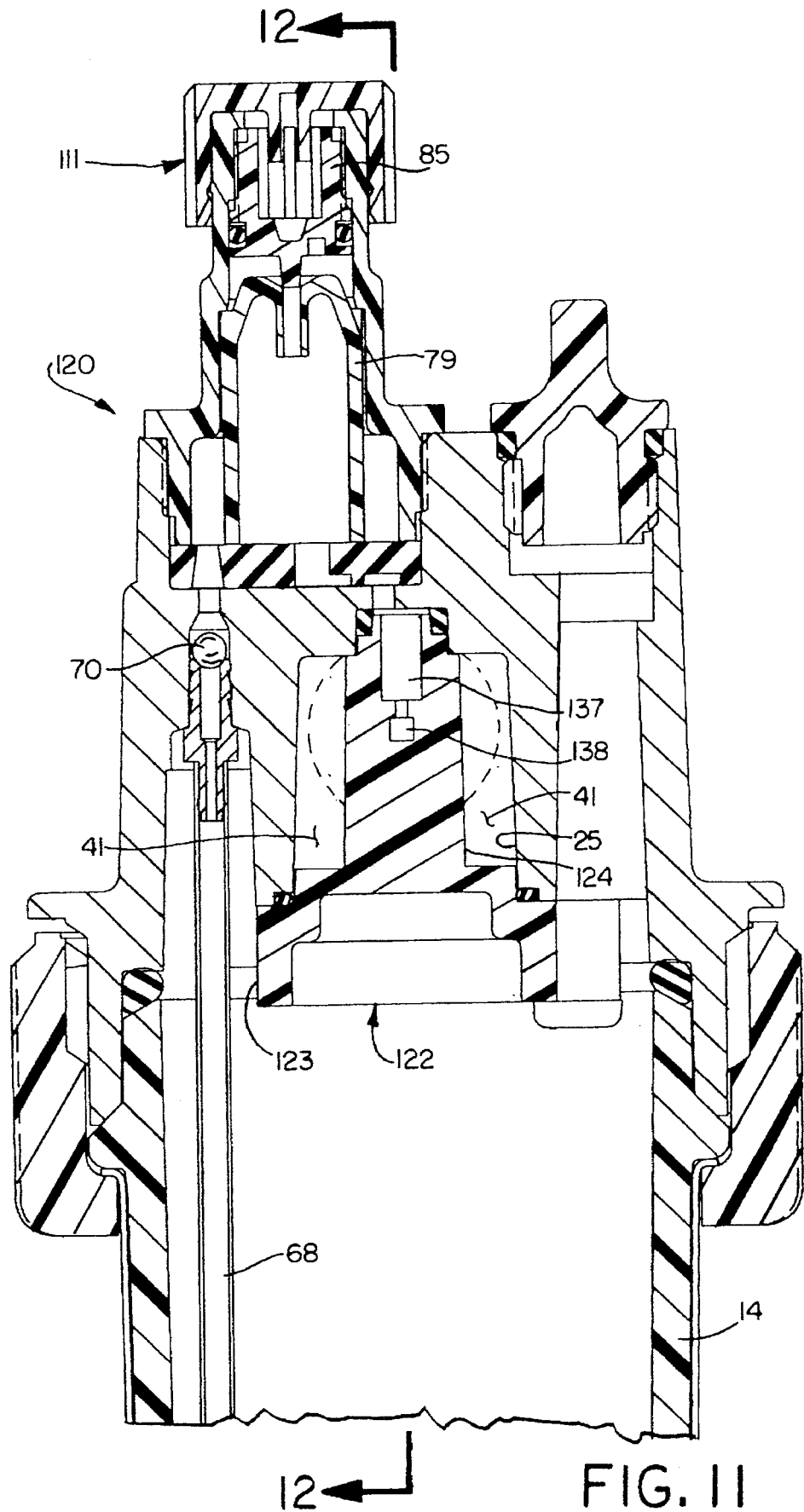
FIG. 11 is a fragmentary cross-sectional view of another embodiment of airline lubricator according to the invention.
Figure 12:
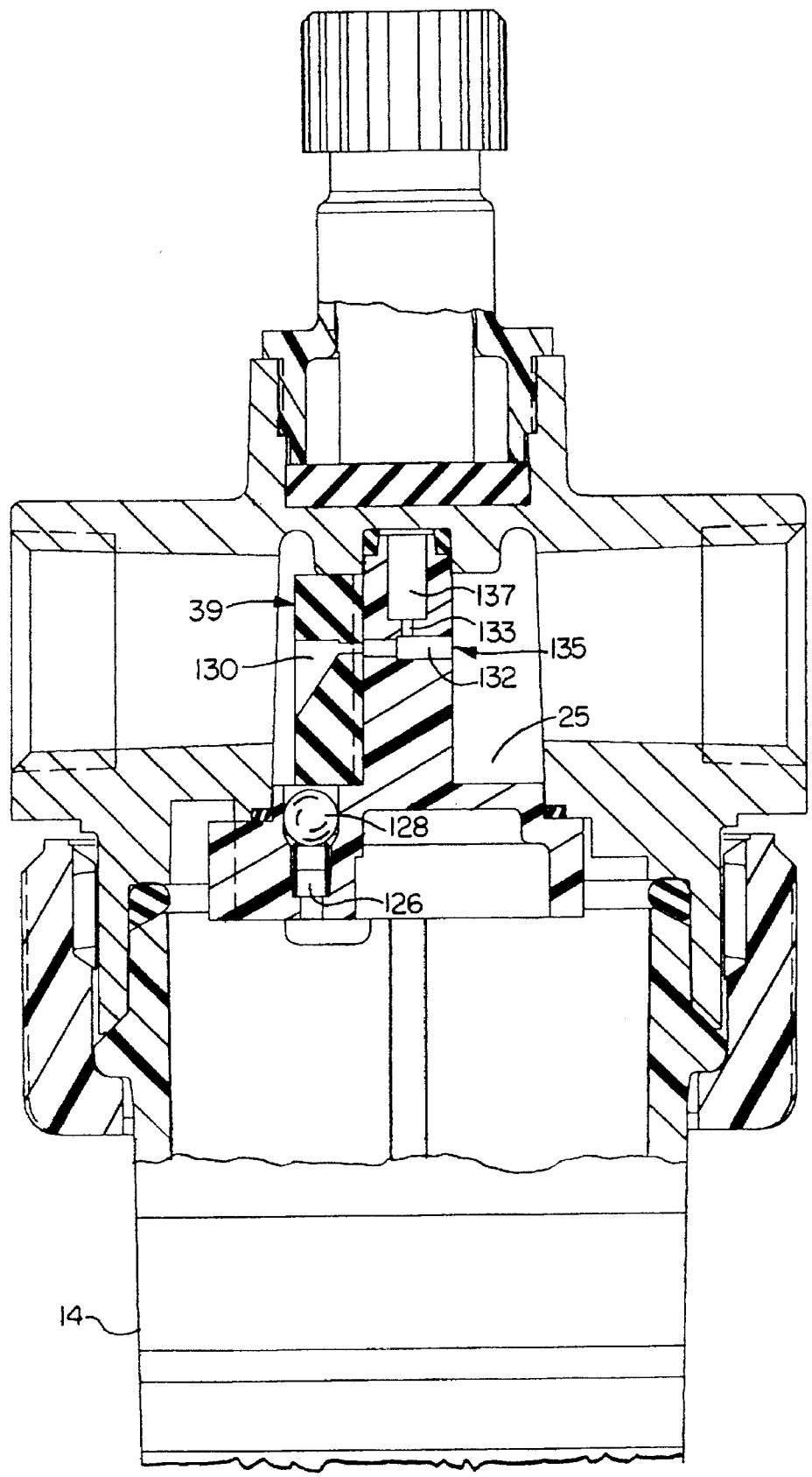
FIG. 12 is a fragmentary cross-sectional view of the lubricator of FIG. 11 taken substantially along the line 12—12 of FIG. 11.

It is mentioned here that other types of venturi sections may be employed in accordance with the present invention. By way of further example, reference is had to FIGS. 11 and 12 wherein another embodiment of air lubricator is indicated generally by reference numeral 120. The lubricator 120 is identical to the lubricator 10 except that the base and injector insert 34 has been replaced by another type of base and injector insert 122 which produces an air-lubricant mist including larger lubricant particles than those resulting from use of the insert.

The base and injector insert 122 includes a base 123 and an injector member 124. The base has a pressurizing passage 126 connecting the bottom of the central chamber 25 to the interior of the bowl 14. A check ball 128 is located in the pressuring passage 126 and held slightly unseated to allow restricted air flow into the bowl for pressurizing the bowl. When line pressure is shut off, the ball will open to vent bowl pressure into the line.

The injector member 124 has a different secondary flow passage configuration. From the inlet passage 130 in the base portion of the flapper member 39, the secondary air stream flows through a straight through passage or throat 132 which is stepped as shown. The nozzle orifice at the end of a lubricant supply passage 133 opens to a side of the throat 132 downstream of the step for injecting lubricant into the secondary air stream which exits from the back side of the injector member for mixing with the primary air stream passing around the injector member past the flapper arms 41.

In operation of the lubricator 120, air flows through the unit along two paths. At low air flow rates, the majority of the air flows through the venturi section 135. The rest of the air slightly deflects and flows by the flapper arms 41. The velocity of the air flowing through the venturi section creates a pressure drop at the throat 132. This lower pressure allows lubricant to be forced from the bowl through the pickup tube 68 past the check ball 70, to the metering assembly 111 where the rate of lubricant flow is controlled by the metering screw 85. Lubricant then flows through the inner sight dome 79 where drops are formed and drip for flow to a supply hole 137 in the top of the injector member 124 as above described. The lubricant injected into the secondary air stream is broken into fine particles and mixed with the swirling air to be carried to the venturi section outlet 138 where it joins the air passing by the flapper arms. As the air flow rate increases the flapper deflects further, allowing a greater part of the additional air to bypass the venturi section. This assures the lubricant delivery rate increases linearly with increased air flow rate.

Although the invention has been shown and described with respect to certain preferred embodiments, alterations and modifications will no doubt occur to others skilled in the art upon the reading and understanding of this specification. For instance, it will be appreciated by those skilled in the art that features of the invention may be applied to devices that inject a liquid into a gas stream. In this regard, the references herein to air and lubricant are intended to encompass any gas and any liquid, respectively. The present invention includes all such alterations and modifications falling within the spirit of the herein described invention.

What is claimed is:

1. In an airline lubricator comprising a main flow passage including therein a flow restrictor having an anchored portion from which a resilient flapper portion extends across and normally closes the main passage but is deflectable by pressure of air in the main passage upstream of the flapper portion, a backstop located downstream of the flapper portion and configured to engage the flapper portion along a curved path and to limit maximum deflection of the flapper portion, the backstop having a side surface outwardly flared transverse to the direction of flow in the main passage, and the flapper portion having a length such that maximum deflection of a free end of the flapper portion is limited by engagement with the outwardly flared side surface of the backstop.

2. An airline lubricator as set forth in claim 1, wherein the backstop is configured to be progressively engaged by the flapper portion moving from the anchored portion of the restrictor to the free end of the flapper portion.

3. An airline lubricator as set forth in claim 2, wherein the backstop is progressively engaged by the flapper portion at a gradually curved surface, and the flapper portion extends tangentially with respect to the gradually curved at a point adjacent its anchored portion.

4. An airline lubricator as set forth in claim 3, wherein the anchored portion is thicker than the flapper portion such that they form a corner at their intersection, and the curved surface extends tangentially from an unflexed position of the flapper portion at a point commencing laterally outwardly of the corner formed between the flapper portion and the anchored portion, whereby the bend in the flapper portion when deflected is laterally displaced from the corner where it otherwise would bend.

5. An airline lubricator as set forth in claim 3, wherein the curved surface includes means for laterally displacing the bend in the flapper portion away from its intersection with the anchored portion.

6. An airline lubricator as set forth in claim 1, comprising a body and a lubricant bowl attached to the head, the body having an inlet port for air, an outlet port for a mixture of air and atomized lubricant, and the main passage connecting the inlet port to the outlet port along a substantially straight flow path.

7. An airline lubricator as set forth in claim 6, comprising a venturi section having an air inlet positioned to receive a secondary portion of air passing from the inlet port to the outlet port, a lubricant passageway terminating at a nozzle outlet, and an air passageway directing the secondary portion of air from the air inlet past the nozzle outlet for atomizing lubricant drawn from the nozzle outlet and mixing with the secondary air.

8. An airline lubricator as set forth in claim 7, wherein the air inlet of the venturi section is upstream of the restrictor, and the flow path of the lubricant and secondary air directs the mixture of lubricant and secondary air into the main passage downstream of the restrictor.

9. An airline lubricator as set forth in claim 1, wherein the backstop includes a flow passage opening to an upstream side thereof, and the anchored portion of the flow restrictor has an inlet passage tapering from a relatively wide mouth at an upstream side of anchored portion to a relatively smaller exit opening at the downstream side of the anchored portion, and the exit opening being in fluid communication with the flow passage in the backstop.

10. In an airline lubricator comprising a bowl for containing a lubricant; a body to which the bowl is attached, the body having an inlet port for air, an outlet port for a mixture of air and lubricant, a primary passage connecting the inlet and outlet ports; a venturi section housed in the body, the venturi section including a secondary passage connecting the inlet and outlet ports and a lubricant supply passage intersecting the secondary passage for mixing of lubricant into a secondary air stream passing through the secondary passage; inner and outer sight tubes having open bottoms; an elastomeric sealing plate for sealing the open bottoms to the body, the sealing plate including an inlet passage through which lubricant is supplied from the bowl to a flow space between the inner and outer sight tubes, the sealing plate further including an outlet passage for supplying lubricant from within the inner sight tube to a laterally offset passage in the body vertically disposed above a lubricant supply passage in the body.

11. An airline lubricator as set forth in claim 10, wherein the sealing plate is disc-shaped.

12. An airline lubricator as set forth in claim 11, wherein the sealing plate is axially assembled into a bore in the body, and the inner and outer sight tubes are assembled axially thereover with the sealing plate sandwiched between the inner and outer sight tubes and a bottom of the bore.

13. An airline lubricator as set forth in claim 12, wherein the bore in the body opens to an outer surface of the body not covered by the bowl.

14. An airline lubricator as set forth in claim 10, wherein the sealing plate has a pair of concentric annular sealing beads on the top surface thereof for engaging the bottom edges of the inner and outer sight tubes, respectively.

15. An airline lubricator as set forth in claim 10, wherein the outlet passage has a vertical section opening to the top of the sealing plate radially inwardly of the inner sight tube and a horizontal section extending radially from the vertical section.

16. An airline lubricator as set forth in claim 15, wherein the horizontal section of the outlet passage has a bottom wall thereof formed by a surface of the body.

17. In an airline lubricator comprising a main flow passage including therein a flow restrictor having an anchored portion from which a resilient flapper portion extends across and normally closes the main passage but is deflectable by pressure of air in the main passage upstream of the flapper portion, a backstop located downstream of the flapper portion and configured to engage the flapper portion along a curved path and to limit maximum deflection of the flapper portion, the backstop including a flow passage opening to an upstream side thereof, and the anchored portion of the flow restrictor having an inlet passage tapering from a relatively wide mouth at an upstream side of anchored portion to a relatively smaller exit opening at the downstream side of the anchored portion, and the exit opening being in fluid communication with the flow passage in the backstop.

18. In an airline lubricator comprising a main flow passage including therein a flow restrictor having an anchored portion from which a resilient flapper portion extends across and normally closes the main passage but is deflectable by pressure of air in the main passage upstream of the flapper portion, a backstop located downstream of the flapper portion and configured to engage the flapper portion along a curved path and to limit maximum deflection of the flapper portion, and wherein the anchored portion of the flow restrictor is thicker than the flapper portion such that they form a corner at their intersection, and the curved surface extends tangentially from an unflexed position of the flapper portion at a point commencing laterally outwardly of the corner formed between the flapper portion and the anchored portion, whereby the bend in the flapper portion when deflected is laterally displaced from the corner where it otherwise would bend.

\* \* \* \* \*